US006597700B2

United States Patent
Golikeri et al.

(10) Patent No.: US 6,597,700 B2
(45) Date of Patent: *Jul. 22, 2003

(54) SYSTEM, DEVICE, AND METHOD FOR ADDRESS MANAGEMENT IN A DISTRIBUTED COMMUNICATION ENVIRONMENT

(75) Inventors: Sandeep P. Golikeri, Acton, MA (US); Da-Hai Ding, Lexington, MA (US); Nicholas Ilyadis, Pepperell, MA (US); Timothy Cunningham, Groton, MA (US); Manish Patel, Tyngsboro, MA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,477

(22) Filed: Jun. 30, 1999

(65) Prior Publication Data

US 2003/0067926 A1 Apr. 10, 2003

(51) Int. Cl.$^7$ ............................................. H04L 12/56
(52) U.S. Cl. ...................................... 370/401; 370/392
(58) Field of Search .................................. 370/392, 389, 370/401, 402, 403, 404, 405

(56) References Cited

U.S. PATENT DOCUMENTS 4,597,078 A * 6/1986 Kempf ........................ 370/401

(List continued on next page.)

OTHER PUBLICATIONS

Egevang, K. and P. Francis,, Internet Engineering Task Force (IETF) Request for Comments (RFC) 1631, The IP Network Address Translator (NAT), May 1994.

*Primary Examiner*—Chau Nguyen
*Assistant Examiner*—Keith M. George
(74) *Attorney, Agent, or Firm*—Kevin L. Smith (57) ABSTRACT

A distributed address database management technique involves maintaining an address database by each of a number of interconnected modules. Each module maintains a number of locally owned address entries and a number of remotely owned address entries in the address database. Each module monitors the status of its locally owned address entries, maintains the locally owned address entries based upon the status, and provides the status to the other interconnected modules. Each module maintains the remotely owned address entries based upon the status received from the other interconnected modules. When a module adds a locally owned address entry to its address database, the module notifies the other interconnected modules, which in turn add a corresponding remotely owned address entry to their respective address databases. When a module purges a locally owned address entry from its address database, the module notifies the other interconnected modules, which in turn purge the corresponding remotely owned address entries from their respective address databases. Each module may periodically send a keep-alive message including a list of active addresses to the other interconnected modules, which maintain a persistence timer for each of the remotely owned address entries and purge a particular remotely owned address entry if the corresponding persistence timer expires before receiving a keep-alive message identifying the remotely owned address entry as an active remotely owned address entry. Upon receiving a keep-alive message, a module adds a remotely owned address entry for a particular address to its address database if such a remotely owned address entry is not already maintained in the address database. A module purges all remotely owned address entries from its address database if the module is reconfigured to operate in a stand-alone mode. A module purges all remotely owned address entries associated with a particular interconnected module if that particular interconnected module is removed.

79 Claims, 4 Drawing Sheets

U.S. PATENT DOCUMENTS

| | | | | |
|---|---|---|---|---|
| 4,897,841 A | * | 1/1990 | Gang, Jr. | 370/401 |
| 5,220,511 A | | 6/1993 | Speckhart et al. | |
| 5,222,064 A | * | 6/1993 | Sagawa | 370/401 |
| 5,301,273 A | * | 4/1994 | Konishi | 370/402 |
| 5,343,471 A | * | 8/1994 | Cassagnol | 370/401 |
| 5,678,006 A | | 10/1997 | Valizadeh et al. | |
| 5,689,550 A | | 11/1997 | Garson et al. | |
| 5,966,710 A | | 10/1999 | Burrows | |
| 6,426,955 B1 | | 7/2000 | Dalton, Jr. et al. | |
| 6,308,226 B1 | | 10/2001 | Kainuma | |

* cited by examiner

SYSTEM, DEVICE, AND METHOD FOR ADDRESS MANAGEMENT IN A DISTRIBUTED COMMUNICATION ENVIRONMENT

CROSS-REFERENCE TO RELATED APPLICATIONS

The following commonly-owned United States patent applications may be related to the subject patent application, and are hereby incorporated by reference in their entireties:

Application Ser. No. 09/340,478 entitled SYSTEM, DEVICE, AND METHOD FOR ADDRESS REPORTING IN A DISTRIBUTED COMMUNICATION ENVIRONMENT, filed in the names of Sandeep P. Golikeri, Da-Hai Ding, and Nicholas Ilyadis on even date herewith;

Application Ser. No. 09/343,299 entitled SYSTEM, DEVICE, AND METHOD FOR NETWORK MANAGEMENT IN A DISTRIBUTED COMMUNICATION ENVIRONMENT, filed in the names of Da-Hai Ding, Luc Pariseau, and Brenda Thompson on even date herewith;

Application Ser. No. 09/274,940 entitled NETWORK ADDRESS TRANSLATION IN A NETWORK HAVING MULTIPLE OVERLAPPING ADDRESS DOMAINS, filed in the names of Timothy Cunningham, Thomas Meehan, and Manish Patel on Mar. 23, 1999; and Application Ser. No. 09/274,944 entitled DOMAIN NAME RESOLUTION IN A NETWORK HAVING MULTIPLE OVERLAPPING ADDRESS DOMAINS, filed in the names of Timothy Cunningham, Thomas Meehan, Manish Patel, and Greg Koester on Mar. 23, 1999.

FIELD OF THE INVENTION

The present invention relates generally to communication systems, and more particularly to address management in a communication system.

BACKGROUND OF THE INVENTION

In today's information age, it is typical for computers and computer peripherals to be internetworked over a communication network. The communication network typically includes a plurality of communication links that are interconnected through a number of intermediate devices, such as bridges, routers, or switches. Information sent by a source device to a destination device traverses one or more communication links.

The various communication devices in the communication network, including the computers, computer peripherals, and intermediate devices, utilize various communication protocols in order to transport the information from the source device to the destination device. The communication protocols are typically implemented in layers, which together form a protocol stack. Each protocol layer provides a specific set of services to the protocol layer immediately above it in the protocol stack. Although there are different protocol layering. schemes in use today, the different protocol layering schemes have certain common attributes. Specifically, protocols at the lowest layer in the protocol stack, which are typically referred to as the "layer 1" or "physical layer" protocols, define the physical and electrical characteristics for transporting the information from one communication device to another communication device across a single communication link. Protocols at the next layer in the protocol stack, which are typically referred to as the "layer 2" or "Medium Access Control (MAC) layer" protocols, define the protocol message formats for transporting the information across the single communication link by the physical layer protocols. Protocols at the next layer in the protocol stack, which are typically referred to as the "layer 3" or "network layer" protocols, define the protocol message formats for transporting the information end-to-end from the source device to the destination device across multiple communication links. Higher layer protocols ultimately utilize the services provided by the network protocols for transferring information across the communication network.

In order for a communication device to utilize the services of the communication network, the communication device is assigned various addresses that are used by the different protocol layers in the protocol stack. Specifically, each communication device that participates in a MAC layer protocol is assigned a MAC layer address that is used to identify the particular communication device to other communication devices participating in the MAC layer protocol. Furthermore, each communication device that participates in a network layer protocol is assigned a network layer address that is used to identify the particular communication device to other communication devices participating in the network layer protocol. Other addresses may be used at the higher layers of the protocol stack, for example, for directing the information to a particular application within the destination device.

Therefore, in order for the source device to send a message to the destination device, the source device first encapsulates the message into a network layer protocol message (referred to as a "packet" or "datagram" in various network layer protocols). The network layer protocol message typically includes a source network layer address equal to the network layer address of the source device and a destination network layer address equal to the network layer address of the destination device. The source device then encapsulates the network layer protocol message into a MAC layer protocol message (referred to as a "frame" in various MAC layer protocols). The MAC layer protocol message typically includes a source MAC layer address equal to the MAC layer address of the source device and a destination MAC layer address equal to the MAC layer address the destination device. The source device then sends the MAC layer protocol message over the communication link according to a particular physical layer protocol.

In certain situations, the source device and the destination device may be on different communication links. Therefore, an intermediate device receives the MAC layer protocol message from the source device over one communication link and forwards the MAC layer protocol message to the destination device on another communication link based upon the destination MAC layer address. Such an intermediate device is often referred to as a "MAC layer switch."

In order to forward protocol messages across multiple communication links, each intermediate device typically maintains an address database including a number of address entries, where each address entry includes filtering and forwarding information associated with a particular address. A typical address entry maps an address to a corresponding network interface. Such address entries are typically used for forwarding protocol messages by the intermediate device, specifically based upon a destination address in each protocol message. For example, upon receiving a protocol message over a particular incoming network interface and including a particular destination address, the intermediate device finds an address entry for the destination address, and processes the protocol message based upon the filtering and forwarding information in the address entry. The intermediate device may, for example, "drop" the protocol message or forward the protocol message onto an outgoing network interface designated in the address entry.

Each intermediate device typically creates its address entries dynamically whenever the intermediate device receives an unknown address. For example, when an intermediate device receives a protocol message including an unknown source address, the intermediate device may create an address entry mapping the particular address to the interface over which the protocol message was received. Thereafter, when the intermediate device receives a protocol message with a destination address equal to that particular address, the intermediate device processes the protocol message based upon the filtering and routing information in the address entry. Specifically, the intermediate device typically "drops" the protocol message, if the protocol message is received over network interface that is associated with that particular address, or forwards the protocol message onto the network interface that is associated with that particular address, if the protocol message is received over a different network interface than the network interface associated with that particular network address.

Because an intermediate device typically has a limited amount of memory in which to store address entries, the intermediate device typically purges address entries that become obsolete. For example, the intermediate device typically purges an address entry if that address entry has not been used within a predetermined period of time. Such purged address entries are then available for reuse.

In a typical intermediate device, a central address database is maintained by an address maintenance module, which facilitates address management, and, in particular, facilitates purging obsolete address entries. However, in certain intermediate devices, a separate address database is maintained by various independent modules. In such intermediate devices, it is often necessary for the address databases to be synchronized so that each address database contains the same addresses.

Therefore, each module typically monitors the status of the address entries in its own address database, and purges those address entries that are determined to be obsolete. Unfortunately, a particular address entry may be purged by some modules and not by others, or may be purged by various modules at different times. This can result in the address databases becoming unsynchronized.

Therefore, a technique for address management is needed.

SUMMARY OF THE INVENTION

In accordance with one aspect of the invention, a number of distributed address databases are synchronized. Each address database is maintained by one of a number of interconnected modules. Each module maintains a number of locally owned address entries and a number of remotely owned address entries in the address database. Each module monitors the status of its locally owned address entries, maintains the locally owned address entries based upon the status, and provides the status to the other interconnected modules. Each module also receives the status of its remotely owned address entries from the other interconnected modules, and maintains the remotely owned address entries based upon the status received from the other interconnected modules.

In accordance with another aspect of the invention, when a new address is learned, each of the interconnected modules adds a corresponding address entry to its respective address database. The receiving module learns the new address from a received protocol message, and adds a locally owned address entry for the address to its address database. The receiving module informs the other interconnected modules of the new address by either forwarding the protocol message to a destination module according to the destination address in the protocol message or by sending an explicit new address message to the other interconnected modules. Each of the other interconnected modules adds a remotely owned address entry for the address to its respective address database. The remotely owned address entry includes, among other things, the remotely owned address and a module identifier identifying the receiving (source) module.

In accordance with yet another aspect of the invention, a module determines that a locally owned address entry is obsolete, purges the obsolete locally owned address entry from its address database, and sends a purge message to the other interconnected modules including the obsolete address from the obsolete locally owned address entry. Each of the other interconnected modules purges the corresponding remotely owned address entry from its address database.

In accordance with still another aspect of the invention, each module maintains a persistence timer for each of the remotely owned address entries in its address database, and purges a remotely owned address entry from its address database if the corresponding persistence timer expires. Each module periodically sends a keep-alive message including a list of active addresses to the other interconnected modules. Upon receiving a keep-alive message, a module searches for a remotely owned address entry corresponding to each of the active addresses listed in the keep-alive message. If a remotely owned address entry is found for a particular active address, then the module resets the persistence timer corresponding to the remotely owned address entry. If a remotely owned address entry is not found for a particular active address, then the module adds a remotely owned address entry for the address to its address database and starts a persistence timer for the remotely owned address entry.

In accordance with still another aspect of the invention, a module purges all remotely owned address entries from its address database upon determining that the module has been reconfigured to operate in a stand-alone mode.

In accordance with still another aspect of the invention, one of the interconnected modules may be removed. Each of the remaining interconnected modules purges all of the remotely owned address entries associated with the removed module from its respective address database.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

The address management techniques of the present invention enable a number of distributed address databases to be synchronized. The number of address databases may be distributed within a single communication device and/or among a number of separate communication devices. Each address database is maintained independently by some entity, which, for convenience, is referred to hereinafter as a "module." The various modules are interconnected, for example, via a bus, backplane, or other signaling medium, so that the modules can coordinate address management across the distributed address databases.

Each module supports a number of directly connected communication devices, and is responsible for managing the addresses of its directly connected communication devices. Specifically, each module dynamically "learns" the addresses of its directly connected communication devices, for example, based upon protocol messages sent to and from the directly connected communication devices. Whenever a module "learns" a new address of a directly connected communication device, the module adds an address entry for the address to its address database. After creating the locally owned address entry, the module informs the other interconnected modules of the new address by forwarding the protocol message to a destination module based upon the destination address in the protocol message and/or sending to the other modules an explicit new address message including the new address. Each of the other interconnected modules adds a corresponding address entry for the address to its address database.

For convenience, an address learned by a particular module is referred to hereinafter as a "locally owned address" for that module, while an address learned by another module is referred to hereinafter as a "remotely owned address" for that module. Similarly, an address entry for a locally owned address is referred to hereinafter as a "locally owned address entry," while an address entry for a remotely owned address is referred to hereinafter as a "remotely owned address entry." Thus, each module's address database typically includes both locally owned address entries and remotely owned address entries.

In accordance with the present invention, each module monitors the status of its locally owned address entries in order to identify any locally owned address entries that become obsolete. A locally owned address entry may be considered obsolete, for example, if no protocol messages are sent to or from the corresponding directly connected communication device within a predetermined period of time. When a module determines that a locally owned address entry is obsolete, the module purges the locally owned address entry from its address database, and then sends a purge message to the other modules including the obsolete address from the purged address entry. Upon receiving the purge message, the other modules purge the corresponding remotely owned address entry from their respective address databases, thereby synchronizing their respective address databases.

As long as the purge message is received by all modules, the distributed address databases will be synchronized. However, in certain situations, it is possible for the purge message to be lost or corrupted, such that some or all of the other modules fail to receive the purge message and therefore fail to purge the obsolete address entry. This can cause obsolete address entries to persist in certain address databases, reducing the number of address entries that are available for creating new address entries.

Therefore, in accordance with the present invention, each module may periodically send a keep-alive message to the other modules identifying each locally owned address that the module considers to be "active." Each module also maintains a timer for each remotely owned address entry. A module resets the timer for a particular remotely owned address entry each time the module receives a keep-alive message indicating that the corresponding address is "active." The module purges a particular remotely owned address entry if the corresponding timer expires by reaching a predetermined timeout value. In this way, each module eventually purges an obsolete address entry, even if the purge message was not received by all modules.

The address managment techniques of the present invention have broad applicability. The address management techniques of the present invention can be used in many types of communication devices. The address management techniques of the present invention can also be used for managing addresses at various layers of the protocol stack. Various embodiments that utilize the address management techniques of the present invention are described in detail below.

I. Address Management in an Ethernet Switch Device

In one exemplary embodiment of the present invention, the address management techniques of the present invention are used to manage MAC layer addresses across a number of Ethernet switching modules.

In a preferred embodiment of the present invention, each Ethernet switching module is a particular device that is known as the BayStack (TM) 450 stackable Ethernet switch. The preferred Ethernet switching module can be configured to operate as an independent stand-alone device, or alternatively up to eight (8) Ethernet switching modules can be interconnected in a stack configuration, preferably by interconnecting the up to eight (8) Ethernet switching modules through a dual ring bus having a bandwidth of 2.5 gigabits per second. Within the stack configuration, a particular Ethernet switching module can be configured to operate in either a stand-alone mode, in which the particular Ethernet switching module performs Ethernet switching independently of the other Ethernet switching modules in the stack, or a cooperating mode, in which the particular Ethernet switching module performs Ethernet switching in conjunction with other cooperating Ethernet switching modules. Furthermore, a particular Ethernet switching module in the stack can be dynamically reconfigured between the stand-alone mode and the cooperating mode without performing a system reset or power cycle of the particular Ethernet switching module, and Ethernet switching modules can be dynamically added to the stack and removed from the stack without performing a system reset or power cycle of the other Ethernet switching modules in the stack. The cooperating Ethernet switching modules interoperate, and are managed, as a single virtual Ethernet switch that supports a single address space.

Figure 1:
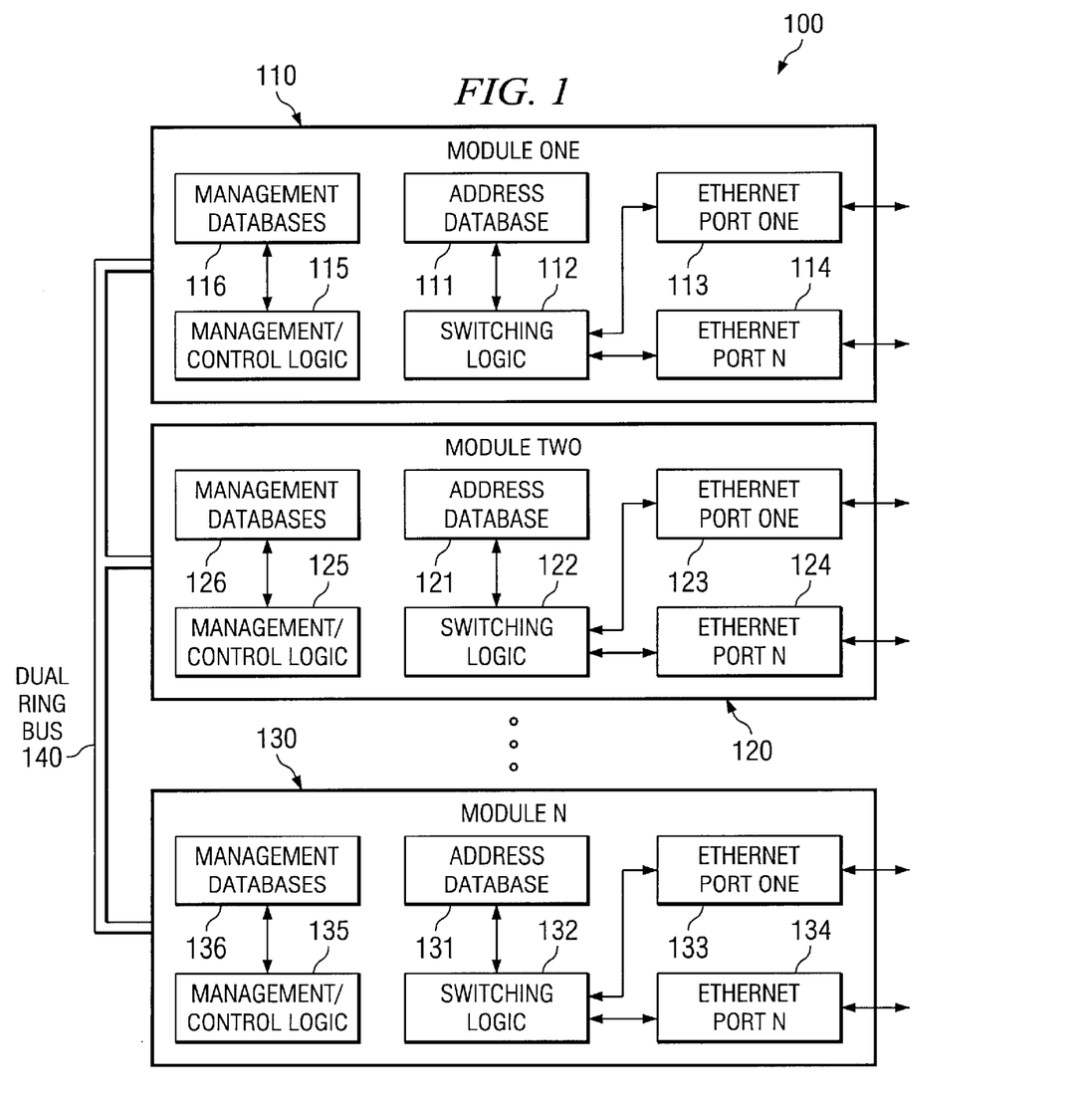
FIG. 1 is a block diagram showing an exemplary stack configuration including a number of interconnected Ethernet switching modules in accordance with one embodiment of the present invention.

FIG. 1 shows an exemplary stack configuration 100 including a number Ethernet switching modules 1 through N that are interconnected through a dual ring bus 140. As shown in FIG. 1, each Ethernet switching module (110, 120, 130) supports a number of physical Ethernet ports (113, 114, 123, 124, 133, 134). Each physical Ethernet port is attached to an Ethernet Local Area Network (LAN) on which there are a number of directly connected communication devices (not shown in FIG. 1). Thus, each directly connected communication device is associated with a particular physical Ethernet port on a particular Ethernet switching module.

Each Ethernet switching module (110, 120, 130) also supports an address database (111, 121, 131). In a preferred Ethernet switching module, the address database is an address table supporting up to 32K address entries. The address entries are indexed using a hashing function based upon the address. The address database for a cooperating Ethernet switching module typically includes both locally owned address entries and remotely owned address entries.

Each Ethernet switching module (110, 120, 130) also includes switching logic (112, 122, 132) for processing Ethernet frames that are received over its associated physical Ethernet ports (113, 114, 123, 124, 133, 134) or from a cooperating Ethernet switching module. Specifically, the switching logic (112, 122, 132) performs filtering and forwarding of Ethernet frames based upon, among other things, the destination address in each Ethernet frame and the address entries in the address database (111, 121, 131). When the switching logic (112, 122, 132) receives an Ethernet frame over one of its associated Ethernet ports (113, 114, 123, 124, 133, 134), the switching logic (112, 122, 132) searches for an address entry in the address database (111, 121, 131) that maps the destination address in the Ethernet frame to one of the associated Ethernet ports or to one of the cooperating Ethernet switching modules. It the destination address is on the same Ethernet port (113, 114, 123, 124, 133, 134) over which the Ethernet frame was received, then the switching logic (112, 122, 132) "drops" the Ethernet frame. If the destination address is on a different one of the associated Ethernet ports (113, 114, 123, 124, 133, 134), then the switching logic (112, 122, 132) forwards the Ethernet frame to that Ethernet port (113, 114, 123, 124, 133, 134). If the destination address is on one of the cooperating Ethernet switching modules (110, 120, 130), then the switching logic (112, 122, 132) forwards the Ethernet frame to that cooperating Ethernet switching module (110, 120, 130). If the switching logic (112, 122, 132) does not find an address entry in the address database (111, 121, 131) for the destination address, then the switching logic (112, 122, 132) forwards the Ethernet frame to all associated Ethernet ports (113, 114, 123, 124, 133, 134) except for the Ethernet port over which the Ethernet frame was received and to all cooperating Ethernet switching modules (110, 120, 130).

Because each Ethernet switching module (110, 120, 130) can be configured to operate as an independent stand-alone device or in a stand-alone mode within the stack, each Ethernet switching module (110, 120, 130) includes management/control logic (115, 125, 135) that enables the Ethernet switching module (110, 120, 130) to be individually managed and controlled, for example, through a console user interface, a Simple Network Management Protocol (SNMP) session, or a world wide web session. Therefore, the preferred management/control logic (115, 125, 135) includes, among other things, a Transmission Control Protocol/Internet Protocol (TCP/IP) stack, an SNMP agent, and a web engine. Furthermore, each Ethernet switching module (110, 120, 130) is assigned MAC and IP addresses, allowing each Ethernet switching module (110, 120, 130) to send and receive management and control information independently of the other Ethernet switching modules (110, 120, 130). All cooperating Ethernet switching modules are assigned the same IP address.

As described in the related patent application entitled SYSTEM, DEVICE, AND METHOD FOR NETWORK MANAGEMENT IN A DISTRIBUTED COMMUNICATION ENVIRONMENT which was incorporated by reference above, the management/control logic (115, 125, 135) maintains a number of management databases (116, 126, 136) for storing configuration and operational information. The management/control logic (116, 126, 136) maintains a management database containing network management objects and parameters that are related to a particular port or interface, and maintains another management database containing network management objects and parameters that are system-wide in scope. When the Ethernet switching module (110, 120, 130) is operating in a cooperating mode within the stack, the management database containing network management objects and parameters that arc system-wide in scope is referred to as the "shadowed" management database, and the management database containing network management objects and parameters that are related to a particular port or interface is referred to as the "segmented" management database. The management databases (116, 126, 136) are described in more detail below. The management/control logic (115, 125, 135) interfaces with the other components of the Ethernet switching module (110, 120, 130) in order to manage and control the operations of the Ethernet switching module (110, 120, 130). Specifically, the management/control logic (115, 125, 135) interfaces to the address database (111, 121, 131), the switching logic (112, 122, 132), the physical Ethernet ports (113, 114, 123, 124, 133, 134), and other components of the Ethernet switching module (not shown in FIG. 1) in order to configure, monitor, and report the operational status of the Ethernet switching module (110, 120, 130) and of the individual components of the Ethernet switching module (110, 120, 130). For convenience, the various interconnections between the management/control logic (115, 125, 135) and the various other components are omitted from FIG. 1.

When operating in a stack configuration, it is often necessary for the cooperating Ethernet switching modules (110, 120, 130) to transfer information (including management information, control information, and data) over the dual-ring bus 140. Therefore, the management/control logic (115, 125, 135) provides an Inter-Module Communication (IMC) service. The IMC service supports both reliable (acknowledged) and unreliable transfers over the dual-ring bus 140. It should be noted that the reliable (acknowledged) IMC service utilizes certain mechanisms, such as acknowledgements and retransmissions, to improve the likelihood of a successful transfer, but does not guarantee a successful transfer. IMC information can be directed to a particular Ethernet switching module (i.e., unicast) or to all Ethernet switching modules (i.e., broadcast).

Each Ethernet switching module (110, 120, 130) maintains locally owned address entries and remotely owned address entries in its associated address database (111, 121, 131) in accordance with the address management techniques of the present invention. Each locally owned address entry includes, among other things, a locally owned address for a directly connected communication device and a port identifier identifying the physical Ethernet port (113, 114, 123, 124, 133, 134) over which the directly connected communication device is coupled to the particular Ethernet switching module (110, 120, 130). Each remotely owned address entry includes, among other things, a remotely owned address for a communication device that is directly connected to a different Ethernet switching module (110, 120, 130) and a module identifier identifying that different Ethernet switching module (110, 120, 130).

A. Adding a New Address

When a particular Ethernet switching module (referred to hereinafter as the "local Ethernet switching module") receives an Ethernet frame from a directly connected communication device, the local Ethernet switching module searches its address database for an address entry associated with the source address. If the local Ethernet switching module fails to find an address entry associated with the source address, then the local Ethernet switching module adds an address entry (i.e., a locally owned address entry) for the source address to its address database. The address entry includes, among other things, the source address and a port identifier identifying the physical Ethernet port over which the Ethernet frame was received. The local Ethernet switching module also searches its address database for an address entry associated with the destination address and processes the Ethernet frame accordingly. Specifically, the local Ethernet switching module drops the Ethernet frame if the destination address is on the same physical Ethernet port as the source address as indicated by the port identifier in the locally owned address entry, forwards the Ethernet frame to the physical Ethernet port indicated by the port identifier in the locally owned address entry if the destination address is on a different physical Ethernet port than the source address, forwards the Ethernet frame to the cooperating Ethernet switching module indicated by the module identifier in the remotely owned address entry if the destination address is on a different Ethernet switching module, and forwards the Ethernet frame over all physical Ethernet ports (except the physical Ethernet port over which the Ethernet frame was received) and to all cooperating Ethernet switching modules if the Ethernet switching module fails to find an address entry associated with the destination address.

When the local Ethernet switching modules forwards the Ethernet frame to a cooperating Ethernet switching module over the dual-ring bus, the local Ethernet switching module includes a module identifier identifying the local Ethernet switching module. This allows the destination Ethernet switching module to determine the local Ethernet switching module for the Ethernet frame.

When the destination Ethernet switching module receives the Ethernet frame from the local Ethernet switching module over the dual-ring bus, the destination Ethernet switching module searches its address database for an address entry associated with the source address. If the destination Ethernet switching module fails to find an address entry associated with the source address, then the destination Ethernet switching module adds an address entry (i.e., a remotely owned address entry) for the source address to its address database. The address entry includes, among other things, the source address and a module identifier identifying the local Ethernet switching module.

In addition to processing the Ethernet frame, which may involve forwarding the Ethernet frame to a destination Ethernet switching module, the local Ethernet switching module also explicitly informs the other cooperating Ethernet switching modules if the source address in the Ethernet frame is a new address. Specifically, the local Ethernet switching module sends an explicit new address message to the cooperating Ethernet switching modules over the dual-ring bus. The new address message includes, among other things, the source address and a module identifier identifying the local Ethernet switching module. Upon receiving the new address message over the dual-ring bus, each cooperating Ethernet switching module adds a corresponding remotely owned address entry to its address database. The remotely owned address entry includes, among other things, the source address and the module identifier.

B. Purging an Obsolete Address

Each Ethernet switching module performs an aging function on the locally owned address entries in its address database in order to detect obsolete locally owned address entries. Specifically, the Ethernet switching module maintains an aging timer for each locally owned address entry in its address database. The Ethernet switching module resets the aging timer for a particular locally owned address entry when the Ethernet switching module processes an Ethernet frame that is addressed from the corresponding locally owned address. The Ethernet switching module considers a particular locally owned address entry to be obsolete when the activity timer for the particular locally owned address entry expires.

When the Ethernet switching device determines that a locally owned address entry is obsolete, the Ethernet switching device purges the obsolete locally owned address entry from its address database. The Ethernet switching device then sends a purge message to the other cooperating Ethernet switching modules in the stack over the dual ring bus. The purge message includes, among other things, the obsolete address from the obsolete locally owned address entry.

Upon receiving the purge message over the dual ring bus, each cooperating Ethernet switching module uses a hash function to find the remotely owned address entry corresponding to the obsolete address, and purges the remotely owned address entry from its address database.

C. Error Recovery

Unfortunately, neither the dual ring bus system nor the various cooperating Ethernet switching modules guarantee reliable delivery of the purge message to the cooperating Ethernet switching modules. Consequently, each cooperating Ethernet switching module that fails to receive the purge message retains the obsolete remotely owned address entry in its address database. This can cause obsolete remotely owned address entries to persist in certain address databases, reducing the number of address entries that are available for creating new address entries.

Therefore, each Ethernet switching module performs an aging function on the remotely owned address entries in its address database in order to detect obsolete remotely owned address entries. The aging function performed on the remotely owned address entries is based upon an explicit keep-alive mechanism, unlike the aging function performed on the locally owned address entries, which is based upon the activity for a particular address.

Specifically, each Ethernet switching module periodically sends a keep-alive message to the other cooperating Ethernet switching modules in the stack over the dual ring bus. The keep-alive message includes a number of the locally owned addresses that are considered by the Ethernet switching module to be active. In a preferred Ethernet switching module, the keep-alive message is sent using an acknowledged inter-module communication mechanism, so that the keep-alive message is retransmitted one or more times if a failure is detected.

Each Ethernet switching module also maintains a persistence timer for each remotely owned address entry in its address database. The Ethernet switching module purges a particular remotely owned address entry from its address database when the persistence timer for the particular remotely owned address entry expires.

When the Ethernet switching module receives a keep-alive message, the Ethernet switching module uses a hash function to find a remotely owned address entry for each active address listed in the keep-alive message. If the Ethernet switching module finds the remotely owned address entry for a particular address, then the Ethernet switching module resets the corresponding persistence timer. The Ethernet switching module also updates the module identifier in the remotely owned address entry if the address has "moved" to a different Ethernet switching module, as indicated by the module identifier in the keep-alive message. If the Ethernet switching module fails to find a remotely owned address entry for a particular address, then the Ethernet switching module adds a remotely owned address entry for the address to its address database.

D. Dynamic Stack Reconfiguration

A cooperating Ethernet switching module can be dynamically reconfigured to operate in the stand-alone mode without performing a system reset or power cycle of the particular Ethernet switching module or the other cooperating Ethernet switching modules in the stack. When a cooperating Ethernet switching module is reconfigured to operate in the stand-alone mode, the reconfigured Ethernet switching module purges all remotely owned address entries from its address database, so that the reconfigured Ethernet switching module maintains only locally owned address entries that are needed for the reconfigured Ethernet switching module to operate independently of the other Ethernet switching modules. Similarly, each of the remaining cooperating Ethernet switching modules in the stack purges any and all remotely owned address entries that are associated with the reconfigured Ethernet switching module (based upon the module identifier in each remotely owned address entry), so that each remaining cooperating Ethernet switching module maintains its locally owned address entries and those remotely owned address entries associated with the other remaining cooperating Ethernet switching modules.

Also, a cooperating Ethernet switching module can be dynamically removed from the stack without performing a system reset or power cycle of the other cooperating Ethernet switching modules in the stack. A cooperating Ethernet switching module is considered to be removed from the stack if it is physically removed from the stack, reset, powered off, or reconfigured to operate in stand-alone mode (which is discussed separately above). When a cooperating Ethernet switching module is removed from the stack, the remaining cooperating Ethernet switching modules in the stack purge all remotely owned address entries corresponding to the removed Ethernet switching module, so that each remaining cooperating Ethernet switching module maintains its locally owned address entries and those remotely owned address entries from the other remaining cooperating Ethernet switching modules.

Furthermore, a cooperating Ethernet switching module can be dynamically added into the stack without performing a system reset or power cycle of the other cooperating Ethernet switching modules in the stack. A cooperating Ethernet switching module is considered to be added to the stack if it is physically added to the stack, becomes operational after a system reset, becomes operational following a power on reset, or is reconfigured to operate in the cooperating mode. In order to synchronize its address database with the other cooperating Ethernet switching modules, the added Ethernet switching module learns the remotely owned addresses from keep-alive messages, and adds the appropriate remotely owned address entries to its address database.

II. Address Management in a Network Address Translator

In another exemplary embodiment of the present invention, the address management techniques of the present invention are used to manage network layer addresses across a number of modules within a network address translator (NAT).

In a preferred embodiment of the present invention, the NAT is a particular device that is known as the BayRS network address translator. The preferred NAT performs network address translation in a communication network having two or more overlapping address domains. Specifically, the NAT translates the source address and destination address fields for routing a packet between overlapping address domains. More particularly, the NAT translates the destination address in the packet from a global address used in the source address domain into a local (domain-specific) address used in the destination address domain, and translates the source address in the packet from a local (domain-specific) address used in the source address domain into a global address for use in the destination address domain. An exemplary NAT is described in the related patent application entitled NETWORK ADDRESS TRANSLATION IN A NETWORK HAVING MULTIPLE OVERLAPPING ADDRESS DOMAINS, which was incorporated by reference above.

In one embodiment of the present invention, the NAT includes a number of modules (referred to as "slots") that are interconnected through a common backplane. Each slot supports a number of network interfaces. Each slot also supports an address database of address translation entries, where each address translation entry maps a local address in one address domain to a global address for use within another address domain. A slot performs network address translation for packets received over its supported network interfaces based upon the address translation entries in its address database.

Figure 2:
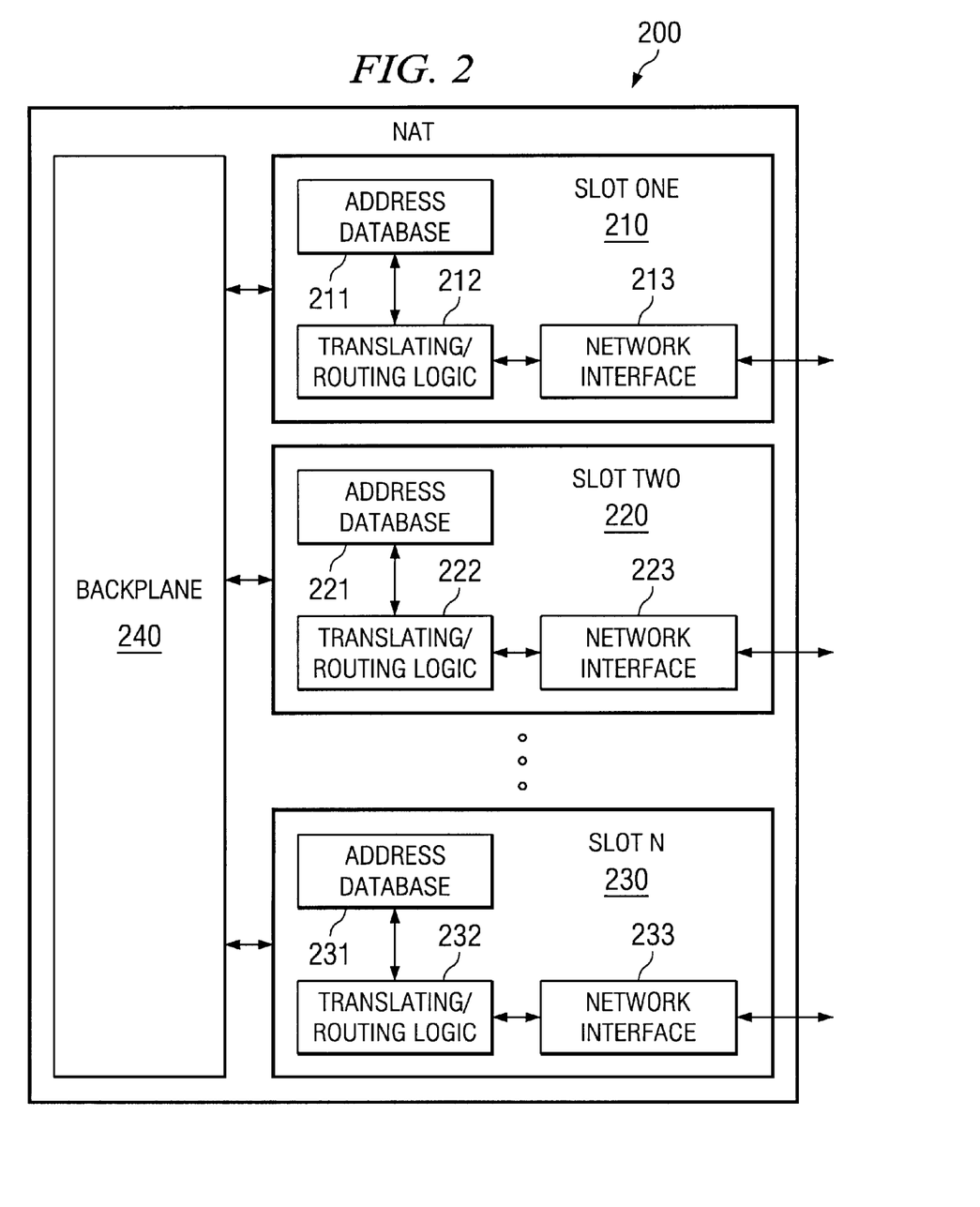
FIG. 2 is a block diagram showing an exemplary network address translator including a number of interconnected slots in accordance with another embodiment of the present invention.

FIG. 2 shows an exemplary NAT 200 that includes a number of slots 1 through N that are interconnected through a backplane 240. As shown in FIG. 2, each slot (210, 220, 230) supports a network interface (213, 223, 233). Each slot (210, 220, 230) also includes an address database (211, 221, 231) of address translation entries, where each address translation entry maps a local address in one address domain to a global address for use within another address domain.

Translating/routing logic (212, 222, 232) in each slot (210, 220, 230) performs network address translation for packets received over the corresponding network interface (213, 223, 233) based upon the address translation entries in the corresponding address database (211, 221, 231).

A. Adding a New Address

In order for a source host in a source address domain to send a packet to a destination host in a destination address domain, the source host obtains a destination host global address associated with the destination host in the destination address domain. In an exemplary embodiment of the present invention, the source host obtains the destination host global address through a domain name resolution procedure, which is described in the related patent application entitled DOMAIN NAME RESOLUTION IN A NETWORK HAVING MULTIPLE OVERLAPPING ADDRESS DOMAINS, which was incorporated by reference above. Briefly, in order to obtain the destination host global address, the source host sends a domain name resolution request message including a domain name associated with the destination host. The domain name resolution request is forwarded to a Domain Name System (DNS) Proxy, which resolves the domain name into the destination host global address by first obtaining the destination host local address from a local DNS Server in the destination address domain, and then sending a translation request message to the NAT including, among other things, the source address domain, the destination host local address, and the destination address domain. The NAT translates the destination host local address into a unique destination host global address, and, in doing so, creates an address translation entry mapping the destination host local address from the destination address domain into the destination host global address used by the source address domain. Once the source host obtains the destination host local address, the source host sends a packet including a destination address equal to the destination host global address and a source address equal to the source host local address in the source address domain.

The packet is received by the NAT over a particular slot. Upon receiving the packet, the slot translates source address and/or the destination address in the packet, as described in the related patent application entitled NETWORK ADDRESS TRANSLATION IN A NETWORK HAVING MULTIPLE OVERLAPPING ADDRESS DOMAINS, which was incorporated by reference above. Briefly, the slot translates the destination address in the packet from the destination host global address into the destination host local address for the destination address domain, using the address translation entry created as part of the domain name resolution procedure. The slot also translates the source address in the packet from the source host local address in the source address domain into a source host global address for use in the destination address domain, and, in doing so, creates an address translation entry mapping the source host local address from the source address domain into the source host global address used by the destination address domain. After translating the addresses in the packet, the slot forwards the translated packet into the destination address domain.

Whenever a particular slot creates an address translation entry, that slot sends the address translation information to the other slots, which in turn create a corresponding address translation entry in their respective address databases.

B. Purging an Obsolete Address

Each slot performs an aging function on the locally owned address translation entries in its address database in order to detect obsolete locally owned address translation entries. Specifically, the slot maintains an activity timer for each locally owned address translation entry in its address database. The slot resets the activity timer for a particular locally owned address translation entry when the slot processes utilizes that locally owned address translation entry to translate an address in a packet. The slot considers a particular locally owned address translation entry to be obsolete when the activity timer for the particular locally owned address translation entry expires.

When the slot determines that a locally owned address translation entry is obsolete, the slot purges the obsolete locally owned address translation entry from its address database. The slot then sends informs the other slots, which in turn purge the corresponding remotely owned address entry from their respective address databases.

C. Error Recovery

In a preferred NAT having multiple slots, all inter-slot communication for adding and purging address translation entries is presumed to be effective. Therefore, no error recovery procedures are required for address management in the preferred NAT.

III. Alternative Embodiments

As described above, the address management techniques of the present invention may be employed for MAC layer address management in an Ethernet switch or for network layer address management in a network address translator. More generally, though, the address management techniques of the present invention may be employed in other types of communication devices having distributed address databases for managing addresses at the MAC layer, the network layer, or at other layers of the protocol stack. For example, the address management techniques of the present invention may also be employed for address management in communication devices including, but not limited to, bridges, routers, bridge-routers (brouters), switches, hubs, and other communication devices. The address management techniques of the present invention may also be employed in other applications, including, but not limited to, address caching in a multiprocessor system.

In situations where an error recovery mechanism is needed, a preferred embodiment of the present invention utilizes a keep-alive mechanism to recover from lost purge messages, as described above with reference to the modular Ethernet switching application. However, an alternative embodiment of the present invention may utilize a different error recovery mechanism in lieu of, or in addition to, the keep-alive mechanism. For example, an alternative embodiment may utilize a retransmission mechanism in which the purge message is retransmitted a number of times in order to improve the likelihood that all modules will receive the puree message. The retransmission mechanism requires that the retransmitting module maintain some history of obsoleted address entries so that the purge message can be retransmitted. Thus, the retransmission mechanism complicates each module by requiring additional logic for maintaining and purging the historical information as well as additional memory for storing the historical information. A module in a preferred embodiment of the present invention does not maintain historical information after an address entry is purged, and therefore the retransmission mechanism is not used in a preferred embodiment of the present invention.

In a preferred embodiment of the present invention, predominantly all of the address management logic is implemented as a set of computer program instructions that are stored in a computer readable medium and executed by an embedded microprocessor system within the communication device. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Figure 3:
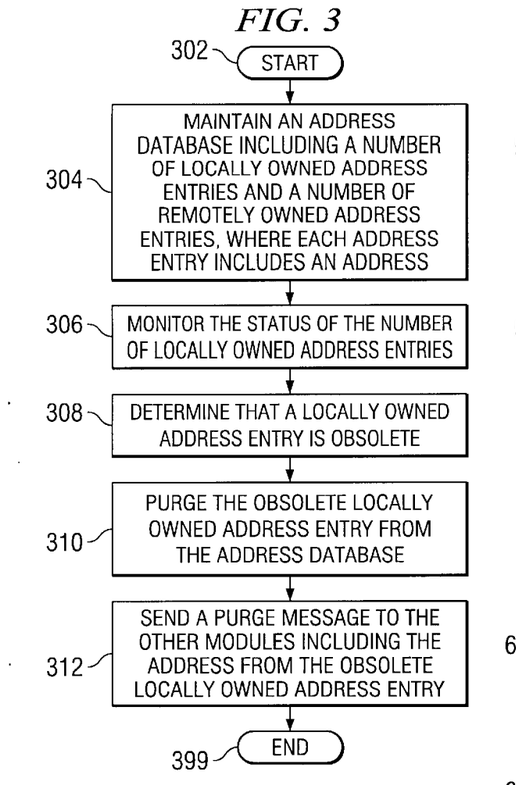
FIG. 3 is a logic flow diagram showing exemplary logic for synchronizing an address database by a module in a communication system having a plurality of interconnected modules in accordance with a preferred embodiment of the present invention.

Thus, various embodiments of the address management techniques of the present invention include a method, device, computer program, or system for synchronizing an address database by a module in a communication system having a plurality of interconnected modules. FIG. 3 is a logic flow diagram showing exemplary logic for synchronizing an address database by a module in a communication system having a plurality of interconnected modules. Beginning in step 302, the logic maintains an address database including a number of locally owned address entries and a number of remotely owned address entries, where each address entry includes an address, in step 304. The logic monitors the status of the number of locally owned address entries, in step 306. Upon determining that a locally owned address entry is obsolete, in step 308, the logic purges the obsolete locally owned address entry from the address database, in step 310, and sends a purge message to the other modules including, among other things, the address from the obsolete locally owned address entry, in step 312. The logic terminates in step 399.

Figure 4:
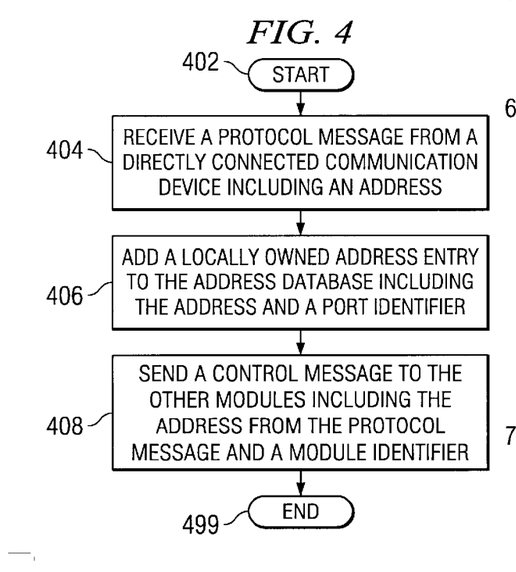
FIG. 4 is a logic flow diagram showing exemplary logic for maintaining the address database in accordance with a preferred embodiment of the present invention.

FIG. 4 is a logic flow diagram showing exemplary logic for maintaining the address database. Beginning in step 402, and upon receiving a protocol message from a directly connected communication device including an address, in step 404, the logic adds a locally owned address entry to the address database including the address and a port identifier, in step 406, and sends a control message to the other modules including the address from the protocol message and a module identifier, in step 408. The control message may include the protocol message itself or may be a separate new address message. The logic terminates in step 499.

Figure 5:
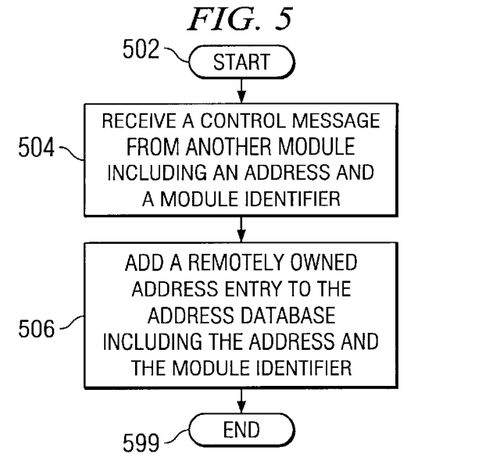
FIG. 5 is a logic flow diagram showing exemplary logic for adding remotely owned addresses to the address database in accordance with a preferred embodiment of the present invention.

FIG. 5 is a logic flow diagram showing exemplary logic for adding remotely owned addresses to the address database. Beginning in step 502, and upon receiving a control message from another module including an address and a module identifier, in step 504, the logic adds a remotely owned address entry to the address database including the address and the module identifier, in step 506. The logic terminates in step 599.

Figure 6:
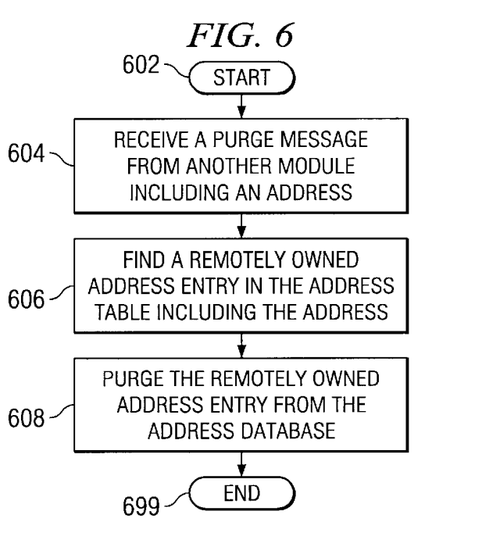
FIG. 6 is a logic flow diagram showing exemplary logic for purging obsolete remotely owned address entries from the address database in accordance with a preferred embodiment of the present invention.

FIG. 6 is a logic flow diagram showing exemplary logic for purging obsolete remotely owned address entries from the address database. Beginning in step 602, and upon receiving a purge message from another module including an address, in step 604, the logic finds the remotely owned address entry in the address database that is associated with the address, in step 606, and purges the remotely owned address entry from the address database, in step 608. The logic terminates in step 699.

Figure 7:
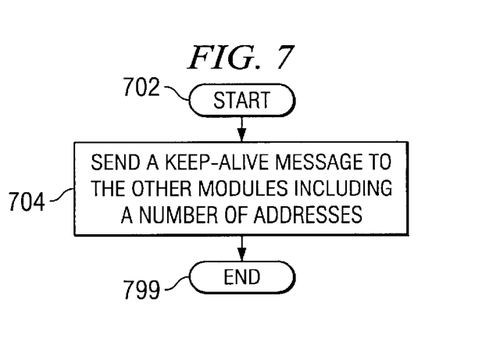
FIG. 7 is a logic flow diagram showing exemplary logic for advertising active addresses among the various modules in accordance with a preferred embodiment of the present invention.

FIG. 7 is a logic flow diagram showing exemplary logic for advertising active addresses among the various modules. Beginning in step 702, the logic periodically sends a keep-alive message to the other modules including a number of address that are considered to be active addresses, in step 704. The logic terminates in step 799.

Figure 8:
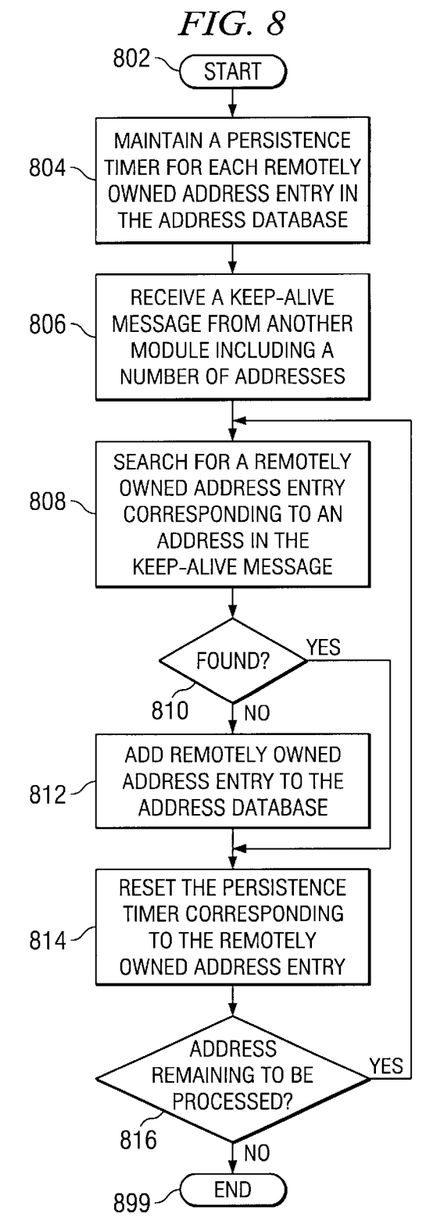
FIG. 8 is a logic flow diagram showing exemplary logic for a keep-alive technique in accordance with a preferred embodiment of the present invention.

FIG. 8 is a logic flow diagram showing exemplary logic for a keep-alive technique. Beginning in step 802, the logic maintains a persistence timer for each remotely owned address entry in the address database, in step 804. Upon receiving a keep-alive message from another module including a number of addresses, in step 806, the logic processes each address as follows. The logic first searches in the address database for a remotely owned address entry corresponding to the address, in step 808. If the remotely owned address entry is found (YES in step 810), then the logic proceeds to reset the persistence timer corresponding to the remotely owned address entry, in step 814. If the remotely owned address entry is not found (NO in step 810), then the logic adds the remotely owned address entry to the address database, in step 812, and resets the persistence timer corresponding to the remotely owned address entry, in step 814. If there is an address from the keep-alive message remaining to be processed (YES in step 816), then the logic recycles to step 808 to process a next address. Otherwise (NO in step 816), the logic terminates in step 899.

Figure 9:
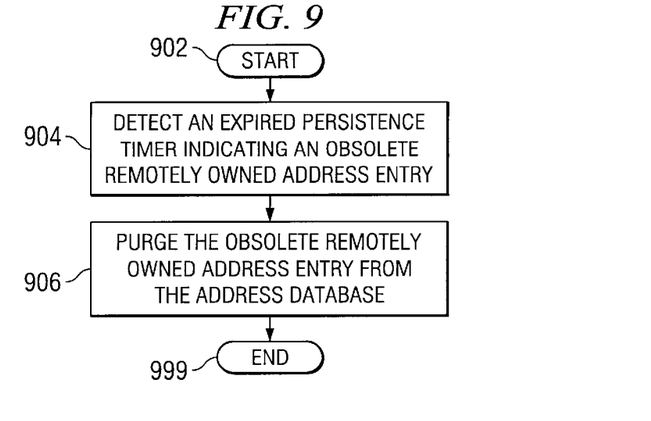
FIG. 9 is a logic flow diagram showing exemplary logic for purging obsolete remotely owned address entries that have persisted in the address database in accordance with a preferred embodiment of the present invention.

FIG. 9 is a logic flow diagram showing exemplary logic for purging obsolete remotely owned address entries that have persisted in the address database. The logic begins in step 902 by monitoring the persistence timers for the remotely owned address entries. Upon detecting an expired persistence timer, in step 904, the logic purges the obsolete remotely owned address entry from the address database, in step 906, and terminates in step 999.

Figure 10:
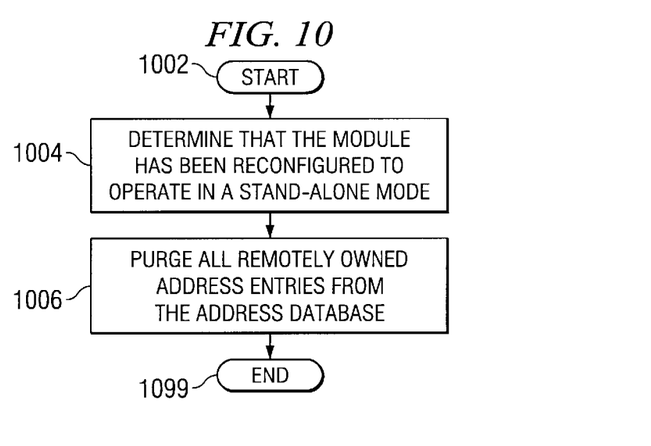
FIG. 10 is a logic flow diagram showing exemplary logic for purging remotely owned address entries from the address database when the module is reconfigured to operate in a stand-alone mode in accordance with a preferred embodiment of the present invention.

FIG. 10 is a logic flow diagram showing exemplary logic for purging remotely owned address entries when the module is reconfigured to operate in a stand-alone mode. The logic begins in stop 1002, and upon determining that the module has been reconfigured to operate in the stand-alone mode, in step 1004, the logic purges all remotely owned address entries from the address database, in step 1006, and terminates in step 1099.

Figure 11:
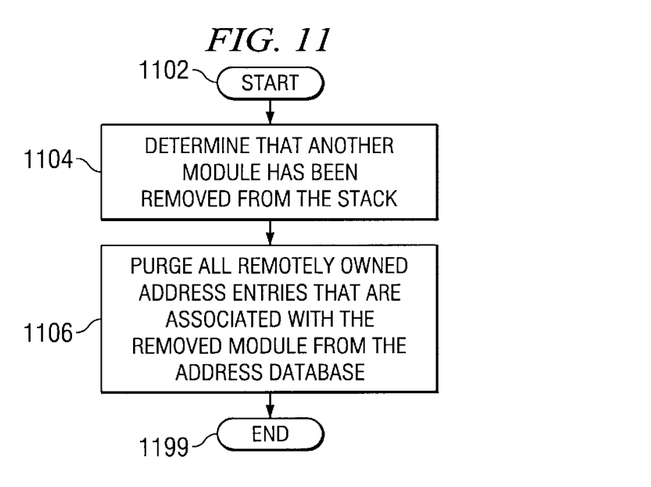
FIG. 11 is a logic flow diagram showing exemplary logic for purging remotely owned address entries associated with a removed module in accordance with a preferred embodiment of the present invention.

FIG. 11 is a logic flow diagram showing exemplary logic for purging remotely owned address entries associated with a module that is removed from the stack. The logic begins in step 1102, and upon determining that another module has been removed from the stack, in step 1104, the logic purges all remotely owned address entries that are associated with the removed module from the address database, in step 1106, and terminates in step 1199.

The present invention may be embodied in other specific forms without departing from the essence or essential characteristics. The described embodiments are to be considered in all respects only as illustrative and not restrictive.

It should be noted that certain terms, such as "frame" and "packet," are used generically to describe various protocol messages that are processed by a communication device, and should not be construed to limit application of the present invention to a specific protocol message format or communication protocol. Thus, a frame or packet may be any protocol message including, but not limited to, a frame, a packet, a datagram, a user datagram, or a cell.

We claim:

1. A method for managing addresses by a module in a communication system having a plurality of interconnected modules, the method comprising:

maintaining an address database including a number of locally owned address entries and a number of remotely owned address entries;

monitoring a status for each of the locally owned address entries in the address database;

maintaining the number of locally owned address entries in the address database based upon the status for each locally owned address entry determined by the module;

providing the status for each of the locally owned address entries to the other interconnected modules;

receiving the status for each of the remotely owned address entries from the other interconnected modules; and maintaining the number of remotely owned address entries in the address database based upon the status of each remotely owned address entry provided by the interconnected module associated with the remotely owned address entry.

2. The method of claim 1, wherein:

monitoring the status for each of the locally owned address entries comprises detecting a new locally owned address;

maintaining the number of locally owned address entries comprises adding a locally owned address entry for the new locally owned address to the address database; and providing the status for each of the locally owned address entries to the other interconnected modules comprises transmitting a control message to the interconnected modules including the new locally owned address.

3. The method of claim 2, wherein the new locally owned address is associated with an interface supported by the module, and wherein the locally owned address entry includes the new locally owned address and an interface identifier.

4. The method of claim 3, wherein the control message includes a module identifier identifying the module.

5. The method of claim 1, wherein:

receiving the status for each of the remotely owned address entries comprises receiving a control message from one of the interconnected modules including an address and a module identifier; and maintaining the number of remotely owned address entries comprises adding a remotely owned address entry for the address to the address database.

6. The method of claim 5, wherein the remotely owned address entry includes the address and the module identifier.

7. The method of claim 1, wherein:

monitoring the status for each of the locally owned address entries comprises determining that a locally owned address entry is obsolete;

maintaining the number of locally owned address entries comprises purging the obsolete locally owned address entry from the address database; and providing the status for each of the locally owned address entries to the other interconnected modules comprises transmitting a purge message to the interconnected modules including the address from the obsolete locally owned address entry.

8. The method of claim 7, wherein providing the status for each of the locally owned address entries comprises transmitting a keep-alive message to a number of the interconnected modules including a number of addresses from locally owned address entries.

9. The method of claim 1, wherein:

receiving the status for each of the remotely owned address entries comprises receiving a purge message from one of the interconnected modules including an address associated with an obsolete remotely owned address entry; and maintaining the number of remotely owned address entries comprises purging the obsolete remotely owned address entry from the address database.

10. The method of claim 9, wherein maintaining the number of remotely owned address entries further comprises:

maintaining a persistence timer for each remotely owned address entry in the address database; and purging a remotely owned address entry from the address database when the corresponding persistence timer expires.

11. The method of claim 10, wherein:

receiving the status for each of the remotely owned address entries comprises receiving a keep-alive message from one of the interconnected modules including a number of addresses, where each address is associated with an active remotely owned address entry; and maintaining the number of remotely owned address entries comprises resetting the persistence timer associated with each of said active remotely owned address entries.

12. The method of claim 11, wherein maintaining the number of remotely owned address entries further comprises adding a remotely owned address entry to the address database for an address received in the keep-alive message.

13. The method of claim 12, wherein the remotely owned address entry includes the address and a module identifier identifying the module from which the keep-alive message was received.

14. The method of claim 1, further comprising:

reconfiguring the module to operate in a stand-alone mode; and purging all remotely owned address entries from the address database upon reconfiguring the module to operate in the stand-alone mode.

15. The method of claim 1, further comprising:

determining that one of the interconnected modules has been removed; and purging all remotely owned address entries associated with the removed module from the address database.

16. A module for managing addresses in a communication system having a plurality of interconnected modules, the module comprising:

an address database; and address maintenance logic operably coupled to maintain a number of locally owned address entries and a number of remotely owned address entries in the address database, wherein the address maintenance logic maintains each locally owned address entry based upon a status determined by the address maintenance logic and maintains each remotely owned address entry based upon a status provided by the interconnected module associated with the remotely owned address entry.

17. The module of claim 16, wherein the address maintenance logic comprises:

detecting logic operably coupled to detect a new locally owned address;

address entry creating logic responsive to the detecting logic and operably coupled to add a locally owned address entry for the new locally owned address to the address database; and transmitting logic responsive to the detecting logic and operably coupled to transmit a control message to the interconnected modules including the new locally owned address.

18. The module of claim 17, wherein the new locally owned address is associated with an interface supported by the module, and wherein the locally owned address entry includes the new locally owned address and an interface identifier.

19. The module of claim 18, wherein the control message includes a module identifier identifying the module.

20. The module of claim 16, wherein the address maintenance logic comprises:

receiving logic operably coupled to receive a control message from one of the interconnected modules including an address and a module identifier; and address entry adding logic operably coupled to add a remotely owned address entry for the address to the address database.

21. The module of claim 20, wherein the remotely owned address entry includes the address and the module identifier.

22. The module of claim 16, wherein the address maintenance logic comprises:

monitoring logic operably coupled to determine that a locally owned address entry is obsolete;

purging logic responsive to the monitoring logic and operably coupled to purge the obsolete locally owned address entry from the address database; and transmitting logic responsive to the purging logic and operably coupled to send a purge message to a number of the plurality of interconnected modules including the address from the obsolete locally owned address entry.

23. The module of claim 22, wherein the address maintenance logic further comprises:

transmitting logic operably coupled to send a keep-alive message to a number of the interconnected modules including a number of addresses from locally owned address entries.

24. The module of claim 16, wherein the address maintenance logic comprises:

first receiving logic operably coupled to receive a purge message from one of the interconnected modules including an address associated with an obsolete remotely owned address entry; and first purging logic responsive to the first receiving logic and operably coupled to purge the obsolete remotely owned address entry from the address database.

25. The module of claim 24, wherein the address maintenance logic further comprises:

timer logic operably coupled to maintain a persistence timer for each remotely owned address entry in the address database; and second purging logic responsive to the timer logic and operably coupled to purge a remotely owned address entry from the address database when the corresponding persistence timer expires.

26. The module of claim 25, wherein the address maintenance logic further comprises:

second receiving logic operably coupled to receive a keep-alive message from one of the interconnected modules including a number of addresses; and timer reset logic responsive to the second receiving logic and operably coupled to reset the persistence timer associated with each of said active remotely owned address entries.

27. The module of claim 26, wherein the address maintenance logic further comprises:

address entry creating logic responsive to the second receiving logic and operably coupled to add a remotely owned address entry to the address database for an address received in the keep-alive message.

28. The module of claim 27, wherein the remotely owned address entry includes the address and a module identifier identifying the module from which the keep-alive message was received.

29. The module of claim 16, further comprising:

reconfiguration logic operably coupled to reconfigure the module to operate in a stand-alone mode; and purging logic responsive to the reconfiguration logic and operably coupled to purge all remotely owned address entries from the address database upon determining that the module has been reconfigured to operate in the stand-alone mode.

30. The module of claim 16, further comprising:

detection logic operably coupled to determine that one of the interconnected modules has been removed; and purging logic responsive to the detection logic and operably coupled to purge all remotely owned address entries associated with the removed module from the address database.

31. The module of claim 16, comprising an Ethernet switching module.

32. The module of claim 16, comprising a slot in a network address translator.

33. The module of claim 16, wherein the address maintenance logic comprises:

means for adding a locally owned address entry to the address database;

means for adding a remotely owned address entry to the address database;

means for maintaining a locally owned address entry in the address database;

means for maintaining a remotely owned address entry in the address database;

means for purging a locally owned address entry from the address database; and means for purging a remotely owned address entry from the address database.

34. A program product comprising a computer readable medium having embodied therein a computer program for managing addresses by a module in a communication system having a plurality of interconnected modules, the computer program comprising:

address maintenance logic operably coupled to maintain a number of locally owned address entries and a number of remotely owned address entries in an address database, wherein the address maintenance logic maintains each locally owned address entry based upon a status determined by the address maintenance logic and maintains each remotely owned address entry based upon a status provided by the interconnected module associated with the remotely owned address entry.

35. The program product of claim 34, wherein the address maintenance logic comprises:

detecting logic programmed to detect a new locally owned address;

address entry creating logic responsive to the detecting logic and programmed to add a locally owned address entry for the new locally owned address to the address database; and transmitting logic responsive to the detecting logic and programmed to transmit a control message to the interconnected modules including the new locally owned address.

36. The program product of claim 35, wherein the new locally owned address is associated with an interface supported by the module, and wherein the locally owned address entry includes the new locally owned address and an interface identifier.

37. The program product of claim 36, wherein the control message includes a module identifier identifying the module.

38. The program product of claim 34, wherein the address maintenance logic comprises:

receiving logic programmed to receive a control message from one of the interconnected modules including an address and a module identifier; and address entry adding logic programmed to add a remotely owned address entry for the address to the address database.

39. The program product of claim 38, wherein the remotely owned address entry includes the address and the module identifier.

40. The program product of claim 34, wherein the address maintenance logic comprises:

monitoring logic programmed to determine that a locally owned address entry is obsolete;

purging logic responsive to the monitoring logic and programmed to purge the obsolete locally owned address entry from the address database; and transmitting logic responsive to the purging logic and programmed to send a purge message to a number of the plurality of interconnected modules including the address from the obsolete locally owned address entry.

41. The program product of claim 40, wherein the address maintenance logic further comprises:

transmitting logic programmed to send a keep-alive message to a number of the interconnected modules including a number of addresses from locally owned address entries.

42. The program product of claim 34, wherein the address maintenance logic comprises:

first receiving logic programmed to receive a purge message from one of the interconnected modules including an address associated with an obsolete remotely owned address entry; and first purging logic responsive to the first receiving logic and programmed to purge the obsolete remotely owned address entry from the address database.

43. The program product of claim 42, wherein the address maintenance logic further comprises:

timer logic programmed to maintain a persistence timer for each remotely owned address entry in the address database; and second purging logic responsive to the timer logic and programmed to purge a remotely owned address entry from the address database when the corresponding persistence timer expires.

44. The program product of claim 43, wherein the address maintenance logic further comprises:

second receiving logic programmed to receive a keep-alive message from one of the interconnected modules including a number of addresses; and timer reset logic responsive to the second receiving logic and programmed to reset the persistence timer associated with each of said active remotely owned address entries.

45. The program product of claim 44, wherein the address maintenance logic further comprises:

address entry creating logic responsive to the second receiving logic and programmed to add a remotely owned address entry to the address database for an address received in the keep-alive message.

46. The program product of claim 45, wherein the remotely owned address entry includes the address and a module identifier identifying the module from which the keep-alive message was received.

47. The program product of claim 34, further comprising:

reconfiguration logic programmed to reconfigure the module to operate in a stand-alone mode; and purging logic responsive to the reconfiguration logic and programmed to purge all remotely owned address entries from the address database upon determining that the module has been reconfigured to operate in the stand-alone mode.

48. The program product of claim 34, further comprising:

detection logic programmed to determine that one of the interconnected modules has been removed; and purging logic responsive to the detection logic and programmed to purge all remotely owned address entries associated with the removed module from the address database.

49. A method for synchronizing a plurality of distributed address databases maintained by a plurality of interconnected modules, the method comprising the steps of:

maintaining, by each module, an address database including a number of locally owned address entries and a number of remotely owned address entries;

monitoring, by each module, a status for each of the locally owned address entries in the address database;

maintaining, by each module, the number of locally owned address entries in the address database based upon the status for each locally owned address entry determined by the module;

providing, by each module, the status for each of the locally owned address entries to the other interconnected modules;

receiving, by each module, the status for each of the remotely owned address entries from the other interconnected modules; and maintaining, by each module, the number of remotely owned address entries in the address database based upon the status of each remotely owned address entry provided by the interconnected module associated with the remotely owned address entry.

50. The method of claim 49, wherein:
monitoring the status for each of the locally owned address entries comprises detecting a new locally owned address by a first module of the plurality of interconnected modules;
maintaining the number of locally owned address entries comprises adding a locally owned address entry for the new locally owned address by said first module to the address database;
providing the status for each of the locally owned address entries to the other interconnected modules comprises transmitting a control message by said first module to the plurality of interconnected modules including the new locally owned address;
receiving the status for each of the remotely owned address entries comprises receiving the control message by a number of interconnected modules; and
maintaining the number of remotely owned address entries comprises adding a remotely owned address entry for the address by each of said number of interconnected modules to the address database.

51. The method of claim 50, wherein the new locally owned address is associated with an interface supported by said first module, and wherein the locally owned address entry includes the new locally owned address and an interface identifier.

52. The method of claim 51, wherein the control message includes a module identifier identifying the module.

53. The method of claim 52, wherein the remotely owned address entry includes the address and the module identifier.

54. The method of claim 49, wherein:
monitoring the status for each of the locally owned address entries comprises determining by a first module that a locally owned address entry is obsolete;
maintaining the number of locally owned address entries comprises purging the obsolete locally owned address entry by said first module from the address database;
providing the status for each of the locally owned address entries to the other interconnected modules comprises transmitting a purge message by said first module to the plurality of interconnected modules including the address from the obsolete locally owned address entry;
receiving the status for each of the remotely owned address entries comprises receiving the purge message by a number of the interconnected modules, the purge message including the address identifying an obsolete remotely owned address entry in each of said number of interconnected modules; and
maintaining the number of remotely owned address entries comprises purging the obsolete remotely owned address entry by each of said number of interconnected modules from the address database.

55. The method of claim 49, wherein maintaining the number of remotely owned address entries further comprises:
maintaining, by each module, a persistence timer for each remotely owned address entry in the address database; and
purging, by each module, a remotely owned address entry from the address database when the corresponding persistence timer expires.

56. The method of claim 55, wherein:
providing the status for each of the locally owned address entries to the other interconnected modules comprises transmitting a keep-alive message by a first module to the plurality of interconnected modules including a number of addresses from locally owned address entries;
receiving the status for each of the remotely owned address entries comprises receiving the keep-alive message by a number of interconnected modules, where each address is associated with an active remotely owned address entry; and
maintaining the number of remotely owned address entries comprises resetting the persistence timer associated with each of said active remotely owned address entries by each of said number of interconnected modules.

57. The method of claim 56, wherein maintaining the number of remotely owned address entries further comprises adding a remotely owned address entry to the address database for an address received in the keep-alive message.

58. The method of claim 57, wherein the remotely owned address entry includes the address and a module identifier identifying the module from which the keep-alive message was received.

59. The method of claim 49, further comprising:
reconfiguring a module to operate in a stand-alone mode; and
purging all remotely owned address entries from the address database maintained by said module upon reconfiguring said module to operate in the stand-alone mode.

60. The method of claim 49, further comprising:
removing one of the interconnected modules;
detecting the removed module by each of the other interconnected modules; and
purging, by each of said other interconnected modules, all remotely owned address entries associated with said removed module from the address database.

61. A communication system comprising a plurality of interconnected modules, wherein each module maintains an address database including a number of locally owned address entries and a number of remotely owned address entries, and wherein each module maintains each of its locally owned address entries based upon a status of each locally owned address entry determined by the module and maintains each of its remotely owned address entries based upon a status of each remotely owned address entry provided by the interconnected module associated with the remotely owned address entry.

62. The communication system of claim 61, wherein each module comprises:
an address database; and
address maintenance logic operably coupled to maintain a number of locally owned address entries and a number of remotely owned address entries in the address database, wherein the address maintenance logic maintains each locally owned address entry based upon a status determined by the address maintenance logic and maintains each remotely owned address entry based upon a status provided by the interconnected module associated with the remotely owned address entry.

63. The communication system of claim 62, wherein the address maintenance logic comprises:
detecting logic operably coupled to detect a new locally owned address;

address entry creating logic responsive to the detecting logic and operably coupled to add a locally owned address entry for the new locally owned address to the address database; and transmitting logic responsive to the detecting logic and operably coupled to transmit a control message to the interconnected modules including the new locally owned address.

64. The communication system of claim 63, wherein the new locally owned address is associated with an interface supported by the module, and wherein the locally owned address entry includes the new locally owned address and an interface identifier.

65. The communication system of claim 64, wherein the control message includes a module identifier identifying the module.

66. The communication system of claim 62, wherein the address maintenance logic comprises:

receiving logic operably coupled to receive a control message from one of the interconnected modules including an address and a module identifier; and address entry adding logic operably coupled to add a remotely owned address entry for the address to the address database.

67. The communication system of claim 66, wherein the remotely owned address entry includes the address and the module identifier.

68. The communication system of claim 62, wherein the address maintenance logic comprises:

monitoring logic operably coupled to determine that a locally owned address entry is obsolete;

purging logic responsive to the monitoring logic and operably coupled to purge the obsolete locally owned address entry from the address database; and transmitting logic responsive to the purging logic and operably coupled to send a purge message to a number of the plurality of interconnected modules including the address from the obsolete locally owned address entry.

69. The communication system of claim 68, wherein the address maintenance logic further, comprises:

transmitting logic operably coupled to send a keep-alive message to a number of the interconnected modules including a number of addresses from locally owned address entries.

70. The communication system of claim 62, wherein the address maintenance logic comprises:

first receiving logic operably coupled to receive a purge message from one of the interconnected modules including an address associated with an obsolete remotely owned address entry; and first purging logic responsive to the first receiving logic and operably coupled to purge the obsolete remotely owned address entry from the address database.

71. The communication system of claim 70, wherein the address maintenance logic further comprises:

timer logic operably coupled to maintain a persistence timer for each remotely owned address entry in the address database; and second purging logic responsive to the timer logic and operably coupled to purge a remotely owned address entry from the address database when the corresponding persistence timer expires.

72. The communication system of claim 71, wherein the address maintenance logic further comprises:

second receiving logic operably coupled to receive a keep-alive message from one of the interconnected modules including a number of addresses; and timer reset logic responsive to the second receiving logic and operably coupled to reset the persistence timer associated with each of said active remotely owned address entries.

73. The communication system of claim 72, wherein the address maintenance logic further comprises:

address entry creating logic responsive to the second receiving logic and operably coupled to add a remotely owned address entry to the address database for an address received in the keep-alive message.

74. The communication system of claim 73, wherein the remotely owned address entry includes the address and a module identifier identifying the module from which the keep-alive message was received.

75. The communication system of claim 62, further comprising:

reconfiguration logic operably coupled to reconfigure the module to operate in a stand-alone mode; and purging logic responsive to the reconfiguration logic and operably coupled to purge all remotely owned address entries from the address database upon determining that the module has been reconfigured to operate in the stand-alone mode.

76. The communication system of claim 62, further comprising:

detection logic operably coupled to determine that one of the interconnected modules has been removed; and purging logic responsive to the detection logic and operably coupled to purge all remotely owned address entries associated with the removed module from the address database.

77. The communication system of claim 61, comprising an Ethernet switch having a plurality of interconnected Ethernet switching modules.

78. The communication system of claim 77, wherein the Ethernet switch is a single manageable switching node supporting a single address space.

79. The communication system of claim 61, comprising a network address translator having a plurality of interconnected slots.

* * * * *